United States Patent [19]

Gruber et al.

[11] Patent Number: 4,596,018
[45] Date of Patent: Jun. 17, 1986

[54] EXTERNAL ELECTRODE TRANSVERSE HIGH FREQUENCY GAS DISCHARGE LASER

[75] Inventors: Carl L. Gruber, St. Michael; Gerald R. Willenbring, St. Paul, both of Minn.

[73] Assignee: Minnesota Laser Corp., St. Paul, Minn.

[21] Appl. No.: 539,993

[22] Filed: Oct. 7, 1983

[51] Int. Cl.$^4$ ............................................... H01S 3/097
[52] U.S. Cl. ........................................ 372/87; 372/61; 372/82; 372/64; 372/83
[58] Field of Search ..................... 372/61, 87, 82, 81, 372/92, 83, 64

[56] References Cited

U.S. PATENT DOCUMENTS

| | | |
|---|---|---|
| 3,149,290 | 9/1964 | Bennett, Jr. et al. . |
| 3,187,270 | 6/1965 | Kogelnik et al. . |
| 3,274,512 | 9/1966 | Okaya . |
| 3,302,127 | 1/1967 | Shao-Chi Lin . |
| 3,396,301 | 8/1968 | Kobayashi et al. . |
| 3,396,343 | 8/1968 | Wesselink . |
| 3,435,363 | 3/1969 | Patel . |
| 3,437,954 | 4/1969 | Herriott et al. . |
| 3,492,599 | 1/1970 | Rigrod . |
| 3,772,611 | 11/1973 | Smith . |
| 4,085,386 | 4/1978 | Farish et al. . |
| 4,112,392 | 9/1978 | Andersson et al. . |
| 4,169,251 | 9/1979 | Laakmann . |
| 4,258,335 | 3/1981 | Donon . |
| 4,281,841 | 8/1981 | Kim et al. . |
| 4,352,188 | 9/1982 | Griffith . |
| 4,353,560 | 10/1982 | Tohill . |
| 4,359,777 | 11/1982 | Fox et al. . |
| 4,363,126 | 12/1982 | Chenausky et al. . |
| 4,372,565 | 2/1983 | Lien . |
| 4,375,690 | 3/1983 | Tabata et al. . |
| 4,455,658 | 6/1984 | Sutter, Jr. . |
| 4,464,760 | 8/1984 | Sutter, Jr. . |
| 4,477,087 | 10/1984 | Sutter, Jr. et al. . |
| 4,481,634 | 11/1984 | Grossman et al. ..................... 378/87 |
| 4,551,843 | 11/1985 | Ouhzuyoun et al. ................. 372/87 |
| 8,000,928 | 7/1980 | Sutter, Jr. . |

FOREIGN PATENT DOCUMENTS 5424591 7/1977 Japan .

Primary Examiner—Leon Scott, Jr.
Attorney, Agent, or Firm—Merchant, Gould, Smith, Edell, Welter & Schmidt

[57] ABSTRACT

A circular bore transversely excited gas discharge laser is disclosed which may be constructed and operated with no physical contact between the active discharge and the metal excitation electrode structure. The discharge is excited by RF in the frequency range 10 MHz to 1 GHz applied to a transverse metal electrode structure designed to maintain a relatively uniform electric field in the discharge bore. The disclosed laser may be configured as a waveguide laser or a large bore laser operating in a non waveguide mode.

A means for inductively coupling RF energy from a suitable RF energy source to the electrode structure and a means for attaching mirrors to the discharge tube using no organic sealing material is disclosed. Without physical contact between the active discharge and the metal excitation electrode structure or organic sealants, long lifetime, superior laser performance, and capability for liquid cooling of the discharge tube is achieved.

37 Claims, 11 Drawing Figures

EXTERNAL ELECTRODE TRANSVERSE HIGH FREQUENCY GAS DISCHARGE LASER

BACKGROUND

1. Field of the Invention

The invention pertains to transverse RF excitation gas lasers with circular geometry having external electrodes and to the attachment of mirrors to the laser discharge tube.

2. Prior Art

Since their earliest development, gas lasers have been constructed using hollow dielectric tubes. Excitation of the active laser gaseous medium has been traditionally accomplished by applying a relatively large DC voltage longitudinally along the length of the discharge tube via two or more metal electrodes placed in contact with the gaseous medium at the ends of the discharge tube or at points intermediate to the ends. Early in the development of gas laser technology, the advantages of removing metal electrodes from contact with the active gaseous laser medium and using RF excitation was recognized. However, interest in removing the metal electrodes from contact with the active gaseous laser medium apparently did not reach the peak necessary to lead to the development of a laser utilizing the technique. In a similar manner, RF excited lasers were left to future development.

Recent development of waveguide lasers has stimulated renewed interest in RF laser excitation, and particularly inductive RF coupling to the laser as disclosed in U.S. Pat. No. 3,772,611 issued Nov. 13, 1973 to Peter W. Smith. The inductive coupling mechanism disclosed by Smith was ineffective in providing for high frequency excitation and results in a non-uniform discharge.

U.S. Pat. No. 4,169,251 issued Sept. 25, 1979 to Katherine D. Laakmann discloses a method for obtaining transverse RF discharge excitation of a waveguide laser. This method requires contact between the laser medium and the transverse metal electrode structure. Problems with reactions of the excited gas with the metal electrodes inside the laser discharge tube will inevitably lead to reduced laser lifetime in a sealed laser and ultimate degradation of laser performance. The invention disclosed in the Laakmann patent required a generally rectangular laser geometry rather than circular. This results in the probability of excitation of undesirable optical modes rather than the axially symmetric modes characteristic of a circular geometry. Furthermore, the Laakmann lasing device specifically is limited to transverse RF excited waveguide lasers.

With the metal electrodes in contact with the discharge medium, random discharge instabilities can occur in the discharge medium resulting in fluctuating laser output power as well as mode instability. Further, the rectangular "slab" construction of the waveguide geometry makes it virtually impossible to apply mirrors directly to the ends of the laser structure. The application of mirrors directly to the ends of the laser is highly desirable for modular construction and long laser lifetime.

SUMMARY OF THE INVENTION

The present invention is intended to circumvent the undesirable features of the prior art while retaining the inherent advantages of transverse RF discharge excitation such as reduction in required discharge voltage, reduced gas dissociation, increased operating efficiency, and discharge stability.

In particular, the present invention comprises construction of a transversely excited RF discharge laser of generally circular geometry from a single or monolithic and homogeneous piece of dielectric material. Electrodes are placed on the external surface of the discharge chamber and are therefore not in contact with the active discharge. The interposed layer of dielectric material serves not only to isolate the electrode material from the discharge, but to provide a discharge stabilizing, purely reactive (lossless), series impedance between the electrodes and the active discharge volume. Furthermore, the invention is not limited by application to waveguide lasers but can also be used with large bore laser structures which will be defined as lasers with both areas greater than 10 mm$^2$.

Design of the discharge tube allows for circular symmetry to be maintained in the entire laser structure, including a circular crosssection laser discharge chamber. The electrode design maintains a nearly uniform electric field across the entire discharge volume, thereby providing more uniform laser pumping and promoting propagation of a single low order transverse laser mode.

An inductive RF coupling mechanism is disclosed that is efficient and readily tunable while still allowing for pi network coupling if desired.

The circular geometry provides for convenient attachment of mirrors directly to the ends of the discharge tube with brazed flanges and a malleable metal compression seal. Long laser structures can be fabricated by simply coupling a series of short sections together with all metal sealed flange assemblies or direct glassed or brazed connections. Thus, single unit integrity can be maintained to meter-length laser bores. The circular geometry further provides for application of integral concentric cooling and RF shielding enclosures, thus allowing use of dielectric fluid laser cooling and minimal EMI emissions from the complete operating laser assembly.

The laser of the present invention has the advantages over the prior art of:

(a) relatively long shelf life and operating life due to the sealed nature of the lasing tube and absence of metal electrodes in direct contact with the gas discharge;

(b) a high degree of mechanical ruggedness and stability as a result of the monolithic construction of the discharge tube and the mirror assemblies;

(c) excellent beam quality and stability as a result of the circular bore and the uniform field maintained by the capacitively coupled external electrodes;

(d) the capability of modulating the laser beam output power;

(e) relatively high efficiency because of the ability to use low power RF excitation to form a glow discharge of plasma; and (f) relatively small, compact packaging.

BRIEF DESCRIPTION OF THE DRAWINGS

Referring to the drawings, wherein like numerals represent like parts throughout the several views;

FIG. 1A illustrates the single solid homogeneous block of dielectric material used to construct the laser waveguide and electrode assembly.

FIG. 3 also illustrates the cooling fluid and electromagnetic interference housing as well as the gas reservoir.

DESCRIPTION OF THE PREFERRED EMBODIMENT

Laser Tube Body

Figure 1A:
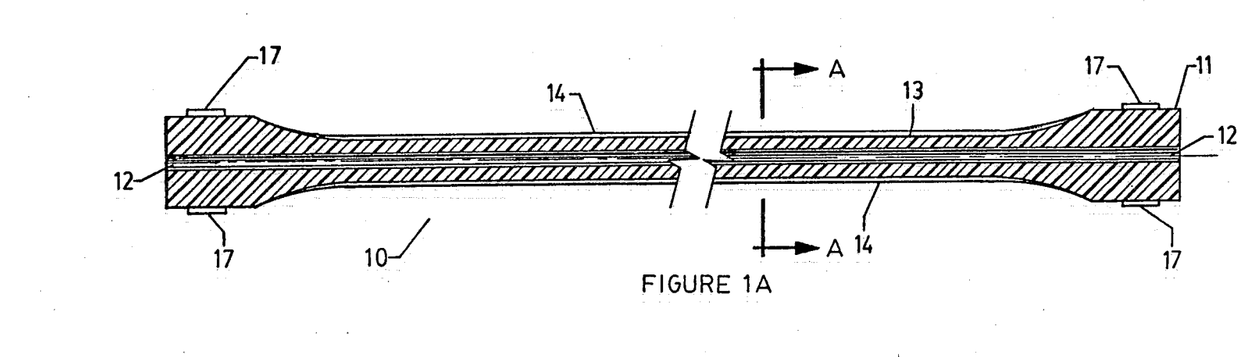
FIG. 1A is a longitudinal sectional view of the waveguide laser embodiment of the present invention.
Figure 1B:
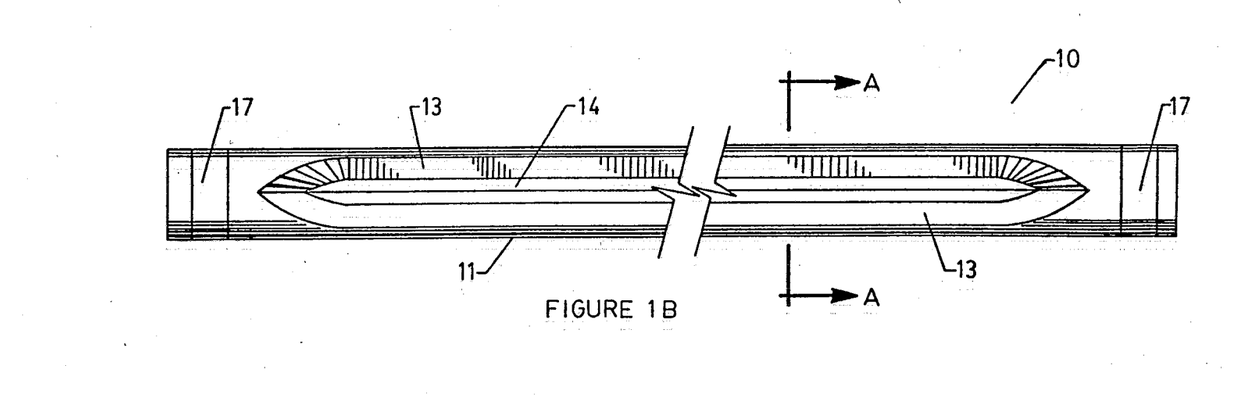
FIG. 1B is a longitudinal view of the waveguide laser embodiment as viewed from an orientation which is rotated 90° from the orientation shown in FIG. 1A.

Referring to FIG. 1A and FIG. 1B we have the waveguide gas laser embodiment according to the invention. The laser tube 10 is seen to consist of a body 11 being composed of a single solid or monolithic homogeneous block of dielectric material such as BeO or $Al_2O_3$ or other suitable ceramic, glass, or dielectric material. The dielectric material is of a high degree of purity and of a high density.

Figure 1C:
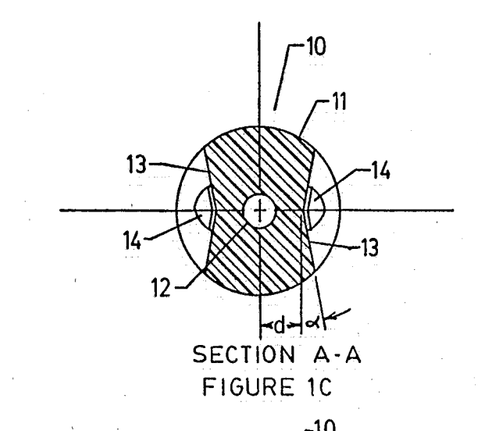
FIG. 1C illustrates a cross-sectional view of the laser of FIGS. 1A and 1B taken along section line A—A.
Figure 1D:
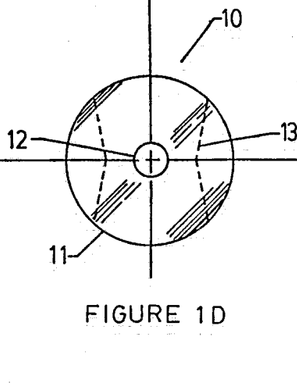
FIG. 1D illustrates an end view of the laser of FIGS. 1A, 1B, and 1C.

A circular hole, as shown in FIGS. 1C and 1D is formed near the center of the body 11 along the entire length, thus defining the active laser volume or chamber 12, within which the RF-excited discharge exists. The chamber 12 of the preferred embodiment is drilled, or otherwise formed, through the center axis. The shape of the body 11 is shown in FIGS. 1C and 1D are roughly circular in the preferred embodiment. However, any other external shape is also feasible such as a rectangular shape. Although the preferred embodiment shows one laser exciting discharge chamber 12, more than one chamber 12 may be formed in the same body 11. The chamber(s) 12 may be formed in the solid body 11 material by drilling or other convenient forming method. The chamber 12 diameter should be suitable for guiding laser light according to conventional wisdom which is approximately 1 to 3.5 mm when used to guide 10.6 micrometer to 9.6 micrometer laser light.

The use of a precise circular bore is advantageous because a very uniform and stable output beam can be generated as a result. A uniform and stable beam is very important in most applications, especially when the laser is used for such delicate and precise purposes as surgery and industrial processing. In contrast, prior art lasers are often constructed by making a sandwich out of slabs of metal and ceramic thereby forming a square waveguide as taught in the Laakmann patent to which reference has previously been made. The design approach of the Laakmann patent can lead to lasers with unstable and/or non-uniform output beams.

Electrode Grooves

Electrode grooves 13 are formed on diametrically opposite sides of the outer wall of the body 11. The opposing grooves 13, having a generally vee shape, are formed accurately parallel to the formed discharge chamber 12. The exact shape and depth are determined in the manner set forth hereinafter in this specification. The grooves 13 are formed by the method of grinding or molding. The grooves 13 extend along the length of the body 11, tapering towards the ends, and terminating a small distance from the end of the body 11, allowing for attachment of body flanges 16 to the ends of the body 11 with with no disruption of the symmetric cross-section at the ends. The bottom of the groove 13 extends to within a small distance of the chamber 12 and has an approximate included angle, $\alpha$, as shown in FIG. 1C. A cross-section of the grooves 13 is illustrated most clearly in FIG. 1A. A frontal view of a groove is best illustrated in FIG. 1B.

Electrodes

Continuous, external electrodes 14 are formed in the grooves 13 by appropriate means for metallization such as the thick film screening technique or vacuum evaporation, or other commonly used methods. The shape of the electrode 14 grooves 13 is chosen in such a way as to maintain a nearly uniform electric field in the discharge chamber 12 when RF energy is applied to the electrodes 14 in the grooves 13. This requires a specific relationship between the distance d, chamber diameter, $2a$, and the groove 13 angle $\alpha$ as illustrated in FIG. 1C. A typical set of dimensions is $d=0.060$ inch, $\alpha=11°$ for BeO body 11 material with $a=0.045$ inch.

A variation of the electrode 14 structure uses a series of longitudinal electrically separated electrode segments to help achieve a uniform electric field in the chamber 12.

Non-Waveguide Laser

Figure 2A:
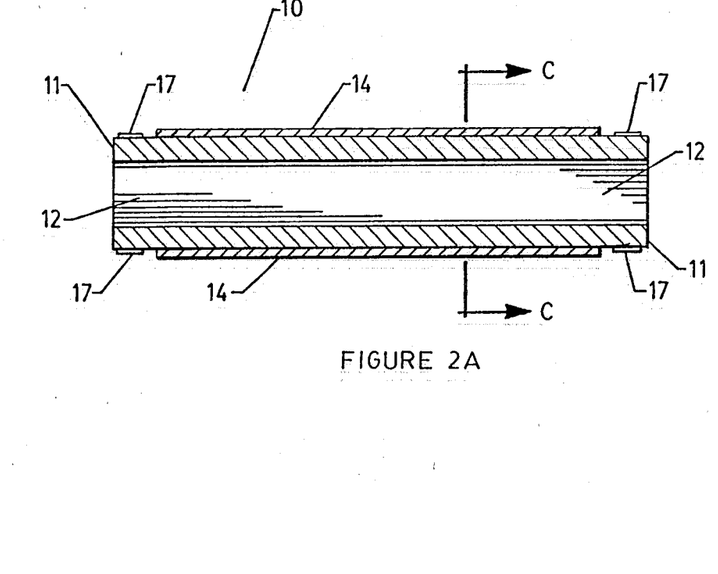
FIG. 2A is a longitudinal sectional view of the large bore, non-waveguide embodiment of the present invention. Again, the single solid block construction is evident.

Referring to FIG. 2, we have a preferred embodiment of the conventional non-waveguide bore gas laser according to the invention. The laser tube 10 is seen to consist of a body 11 being composed of a single solid homogeneous piece of dielectric material such as BeO or $Al_2O_3$ or other suitable ceramic or glass material. An electrode 14 configuration designed to provide a nearly uniform electric field within the chamber 12 is applied to the outer wall of the tube 10 rather than being placed in a groove 13 as used with the waveguide laser.

The discharge chamber 12 is filled with any desired gaseous laser medium. Typically, a $CO_2$ laser mixture comprising $CO_2$, He, and CO and/or $N_2$ is used, but the invention can be used with He and Ne or eximer or any other gas laser mixture at an appropriate total pressure for optimum laser efficiency.

Hermetic Sealing and Contamination Reduction

The sealed life of many $CO_2$ lasers is limited by several factors including (1) leakage of the internal gas or laser medium to the outside and/or seepage of contaminants from the environment into the interior of the laser due to small leaks; (2) outgassing of contaminants from the internal surfaces inside the laser tube 10 and/or (3)

reactions of the excited gas with internal metal electrodes.

The laser of the preferred embodiment eliminates the major cause of shortened sealed laser life by placing the electrodes 14 external to the discharge chamber 12.

In order to achieve long shelf life the laser must be hermetically sealed and free of internal contamination. Filling with research grade ultra-high purity gases such as $CO_2$, $N_2$ or He eliminates one major cause of internal contamination.

In order to further eliminate contamination from inside the laser, an ultra-clean laser assembly procedure is used in the production of the laser of the preferred embodiment prior to filling the laser with the laser gas medium.

As a final means of inhibiting the reduction of output performance of the laser due to contaminants, a gas reservoir 39 with a volume of about 100 cc (compared with the internal volume of the waveguide chamber 12 which is less than 1 cc) can be connected to the fill tube 18 to dilute the effects of contamination and/or the changes in gas composition.

Tests of the laser of the preferred embodiment without any gas reservoir 39 have demonstrated more than 500 hours of operation without a significant change in power output. Therefore, the volume of the gas reservoir 39 can be reduced significantly without affecting the laser lifetime. In fact, the demonstrated 500 hours of operation without any gas reservoir is commercially acceptable in today's marketplace. The present invention, is therefore, being successfully produced with varying sizes of gas reservoirs 39 from none to 100 cc depending upon whether the application requires assured long life without offsetting needs for weight reduction or requires the maximization of weight reduction without the necessity for assured life beyond what is commercially acceptable in today's marketplace.

Since the body 11 is a single enclosed ceramic tube with external electrodes 14, seals are only required on the ends of the body 11 where the laser mirrors 15 are mounted. With the number of seals and total seal surface relatively small, the sealing process is simple and the seals more stable. The prior art square geometry laser tube is not amenable to use of the simply constructed mirror mounts of the present invention.

Figure 3A:
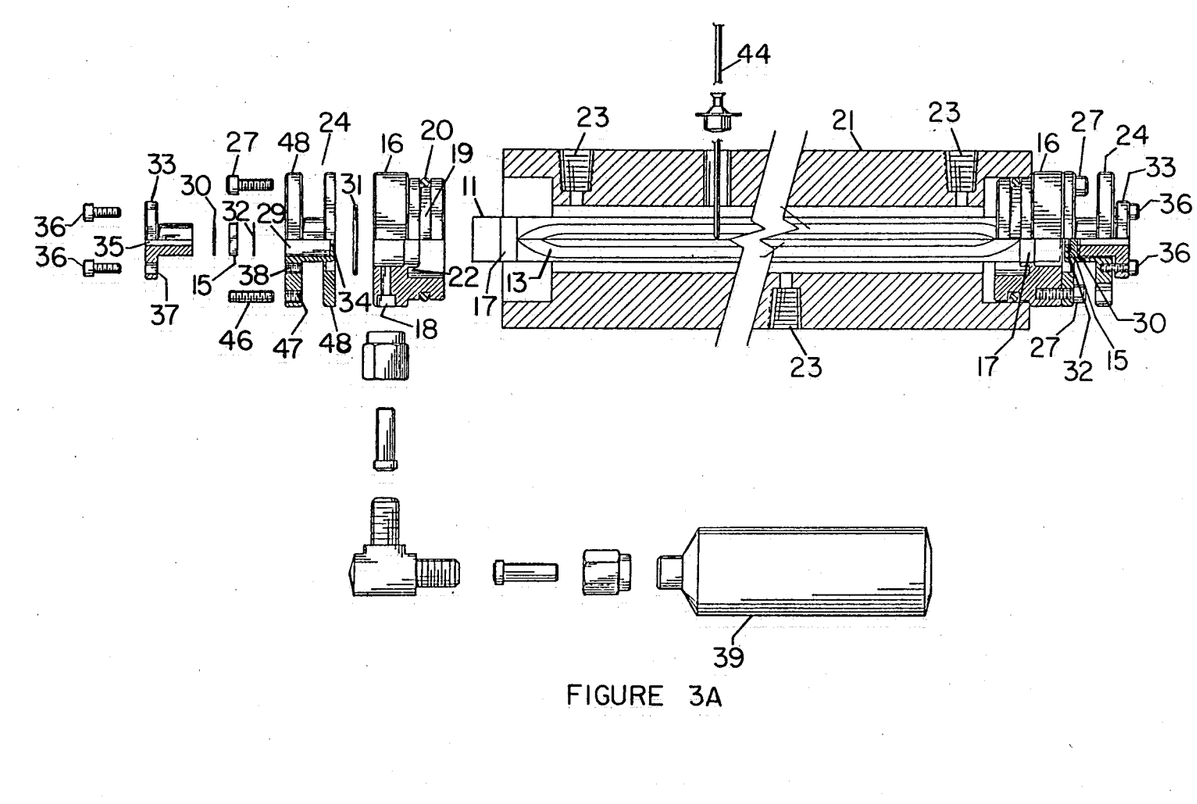
FIG. 3A is a longitudinal view of the waveguide laser embodiment illustrating an exploded view of one of the mirror mounting assemblies and a cross-sectional view of the other mirror mounting assembly.
Figure 3B:
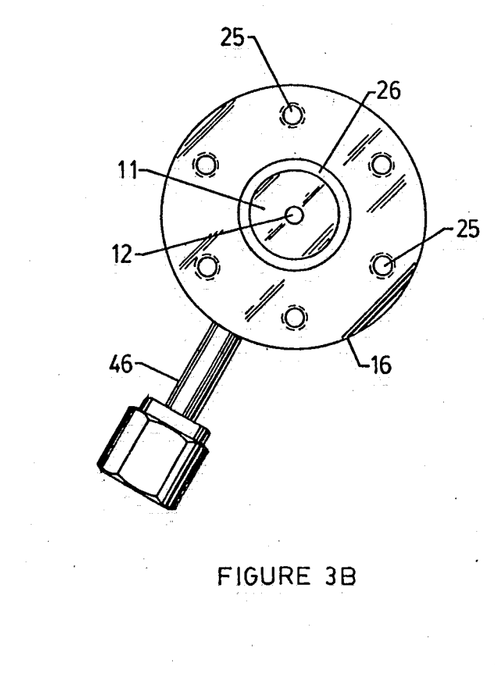
FIG. 3B is the end view of the body flange.

To maintain the hermetically sealed condition of the preferred embodiment, a unique means of attaching the mirrors 15 to the body 11 is used. The mirrors 15 are attached to the laser body 11 of FIGS. 1A, 1B or 2A as shown in the embodiment of FIGS. 3A and 3B. The ends of the laser body 11 are metallized around the circumference to form a narrow metallized ring 17 on both sides as shown in FIGS. 1A, 1B, 2A and 3A. These metallized rings 17 are approximately one mil. thick. As illustrated in the Figures, they are not to scale. A formed metal body flange 16 is slipped over the laser tube 10 and brazed to the metallized rings 17 forming an ultra-high vacuum seal.

One of the body flanges 16 (shown on the left side of FIG. 3A) has a welded-on gas fill and evacuation aperture 18 formed in it to support a gas fill and evacuation tube for ultimate connection to the laser gas reservoir 39.

Cooling of the laser tube 10 is very important in order to obtain high output power from the laser, to prevent overheating of any of the components, and to enhance the stability of the laser output. The laser of the present invention provides for total immersion of the laser tube 10 in inert, non-toxic cooling fluid. The cooling fluid has a dielectric constant which makes the fluid electrically inert and prevents any shorting of the electrodes or other active circuit elements even though the fluid is in direct contact with the electrodes and other active circuit elements. The total immersion of the laser tube 10 in direct contact with the cooling fluid provides very uniform and effective heat exchange.

To provide a means for containing the cooling fluid, the body flange 16 has recessed annular ring 19 for the purpose of retaining a sealing O-ring 20 which provides a leakproof seal between a cooling fluid housing 21 and the body flanges 16. Cooling fluid recess area 22 allows cooling fluid to surround the ends of the body 11. An active discharge also exists within the chamber 12 at this point requiring cooling of this portion of the body 11. The cooling fluid housing 21 supports three cooling fluid ports 23. Two of the ports 23 are for the input of cooling fluid and the other is for the output 23 of the fluid. A conventional recirculating pump and source of cooling fluid is connected to the cooling fluid ports 23 to provide the interior of the housing 21 with a continuously recirculating source of cooling fluid. A heat exchanger may be connected in line with the recirculating pump to shed the heat energy which the cooling fluid has absorbed from the laser tube 10, thereby allowing the cooling fluid to be continuously re-used.

The cooling fluid housing 21 also supports an RF connector 44 for connection of the electrodes 14 to a source of RF power. The RF connector is a standard male and female coaxial connector set. In the preferred embodiment the female portion of the connector is attached to the cooling fluid housing with coaxial cable connecting between the electrodes 14 and the female portion of the RF connector 44.

The high frequency discharge of the laser tube 10 as a result of the RF excitation, is a source of electromagnetic interference which must be shielded. Effective electromagnetic shielding is accomplished by the combination of the stainless steel mirror assemblies and by the fabrication of the housing 21 using aluminum which provides effective shielding such as a conventional coaxial cable provides electro-magnetic shielding.

FIG. 3B illustrates the end view of a body flange 16 as viewed from the left side as it is shown in FIG. 3A. FIG. 3B shows threaded mirror flange receiving holes 25. Annular laser medium communication port 26 allows the laser medium to flow from the laser medium fill tube assembly 45 to the chamber 12 opening. As seen in FIG. 3B, the body flange 16 does not obstruct the line of sight of the chamber 12 allowing the laser beam to pass out of the chamber 12 and impinge upon mirror 15.

Mirror flange 24 is mounted to body flange 16 using mirror flange mounting screws 27 inserted through apertures in the mirror flange which extend entirely through the mirror flange 24 and which are axially aligned with the threaded mirror flange receiving holes 25. There are six of these mirror flange mounting screws located equidistant from one another around the periphery of the mirror flange 24. A first circular malleable metal ring 31 such as indium or its alloys with tin and lead is placed between the body flange 16 and the mirror flange 24. As the mounting screws 27 are tightened the malleable ring 31 cold flows in the space between the two flanges 16 and 24 forming a conformal vacuum seal between the two flanges 16 and 24.

A circular laser mirror 15 is placed in mirror recess 24 formed in mirror flange 24. A second malleable metal ring 32 is placed between the mirror flange 24 and the mirror 15. In front of the laser mirror 15 is placed a polymer washer 30. The combination of the mirror sandwiched between the washer 30 and the metal ring 32 allows uniform pressure to be applied and to be maintained sufficient to seal without fracturing the mirror. Compression plunger 33 is inserted in the mirror recess 29 and is affixed to the mirror flange 24 using screws 36 through compression plunger apertures 37 which are axially aligned with threaded receiving holes 38 in the mirror flange 24.

Mirror flange 24 has a centrally located laser beam aperture 34 aligned with the chamber 12 of the laser tube 10 to allow the laser beam to contact the laser mirrors 15. One of the two compression plungers 33 (the one on the left in FIG. 3A) is fabricated with an aperture 35 in axial alignment with the laser beam aperture 34 of the mirror flange and the longitudinal axis of the chamber 12. This compression plunger 33 is affixed to the laser tube 10 end having a partially transmissive output mirror 15 such as zinc selenide to allow the laser beam to exit the laser tube 10. The other compression plunger 33 forms a solid end cap and is used in conjunction with the highly reflective laser mirror 15 such as enhanced silicon.

Alignment of the laser mirrors 15 with each other to achieve parallelism between the mirrors 15 to within micro-radians is accomplished by torqueing the mirror flange set screws 46. There are four mirror flange set screws 46 although for illustration purposes FIG. 3A shows only one set screw 46 on the exploded portion of the drawing on the left side. The right mirror flange 24 also has four set screws 46 although none are shown. As the set screws 46 are torqued, the left circular fin 48 of the mirror flange 24 bends relative to the right circular fin 48 if any set screw 46 is torqued more or less than another. By varying the torque of the set screws 46 and observing the output of the laser tube during the torqueing procedure, the alignment of the mirrors relative to one another can be effected. The variation of torque on the set screws 46 actually bends the mirror recess 29 enough to affect the alignment. In this manner mirrors 15 can be tilted by up to 2° with respect to the laser axis while maintaining an ultra-high vacuum seal.

No organic materials are needed to provide the required vacuum seal integrity of the end flange assemblies. The properties of malleable metals such as indium or it's alloys with lead and tin are such that no special requirements are placed on the material or preparation of the mirrors 15. For $CO_2$ lasers, for example, ZnSe or GaAs or Ge mirrors may be used, as well as others for this and other gas laser mixtures.

Sturdy materials such as stainless steel are used for the flanges 16 and 24 and the compression plunger 33 to provide structural rigidity, dimensional stability, and freedom from corrosion.

Figure 2B:
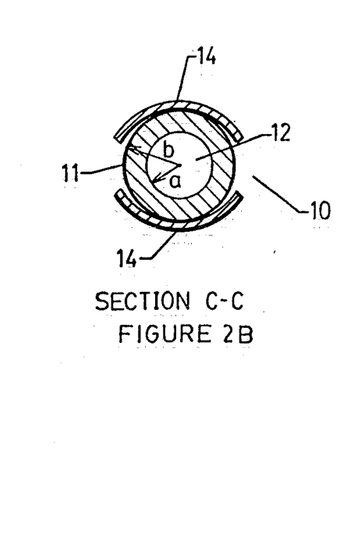
FIG. 2B is a cross-sectional view of the laser of FIG. 2A taken along section line C—C.

For the purposes of non-waveguide lasers as shown in FIGS. 2A and 2B, the first indium ring 31 can be replaced by a metal bellows or other seal brazed to the body flange 16 and the mirror flange 24 at their outer periphery. Mirror adjustment is then effected by external means.

Lasers longer than approximately 10–12 inches can be provided by the coupling of laser tubes together by virtue of mating body flanges 16 with malleable metal seals between adjacent body flanges 16 or by using long continuous formed ceramic tubes. These longer lasers can achieve up to 20 watts or greater of continuous output power as contrasted with approximately 5 watts continuous output power for a single tube 10 laser of 10–12 inches in length.

Inductive Coupling

Figure 4:
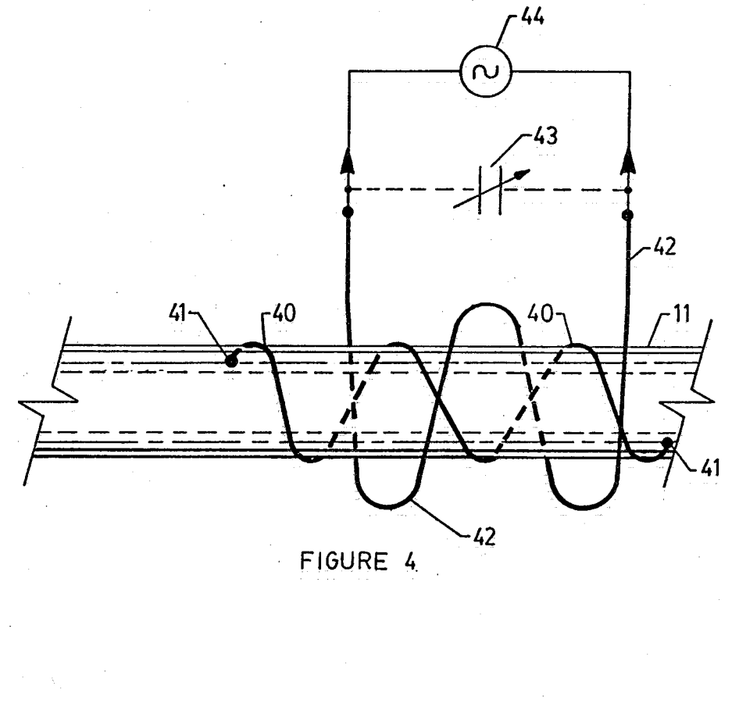
FIG. 4 is a schematic diagram of the network for coupling RF power to the electrodes by mutual inductance.

FIG. 4 also illustrates a means for inductively coupling RF energy to the laser discharge tube 10 electrodes 14. A secondary coil 40 of suitable metallic conductor such as copper or silver is wrapped around the laser body 11, appropriately insulated from the electrode material 14. The ends of the secondary coil 40 are soldered to opposite electrode surfaces at points 41 as shown, thus forming a resonant circuit with the coil inductance and the interelectrode capacitance. For frequencies at which the electrode structure greater than $\lambda/8$ (where $\lambda/2$ is the characteristic wave length in the electrode structure), more than one secondary coil 40 may be required to maintain a uniform voltage along the length of the laser tube 10.

A primary coil 42 of larger diameter than the secondary coil is formed concentrically around the secondary coil 40 to mutually couple RF power or energy between the two. The ends of the primary coil 42 are connected to the RF power supply 44. Adjustment of the turns ratio and the position of the primary coil 42 with respect to the secondary coil 40 allows the impedance transformation to be adjusted. With the correct number of turns for each coil, excellent impedance matching is obtained with a voltage standing wave ratio approaching 1.0. Trimmer capacitor 43 compensates the inductance of the RF transformer to yield a nearly pure resistance to be seen at the primary coil terminals. A source of RF energy 44 is connected to the primary coil terminals by a coaxial coil or other suitable means. The preferred embodiment of FIG. 4 can be replaced by a simple pi coupling network, with solder connections to the electrode material, as an alternative embodiment.

RF power or energy can be coupled to the primary coil 42 either through the laser mirror and body flanges 16 and 24, or through the cooling fluid housing 21 by means of a coaxial connector as shown in FIG. 3A. So as to not further complicate FIG. 3A, the primary coil 42 and the secondary coil 40 has not been shown. Only a stub of coaxial cable is shown; it being understood that the coaxial cable 13 is to connect to the primary 42 coils which surround the laser body 11 within the cooling fluid housing 21.

The preferred embodiment of FIGS. 1A, 1B, and 3A have been operated using the coupling network shown in FIG. 4 as a $CO_2$ laser with 100 Torr gas pressure, yielding up to 5 watts output power from a tube 10 inches long.

Electrode Geometry

The electrode 14 shape and depth—the electrode 14 geometry—is important to achieve the end result of a uniform discharge along the entire length of the laser tube 10 at an electric field intensity suitable for the chamber 12 diameter of the particular laser tube 10 and laser gas mixture to be used.

Figures 5, 6:
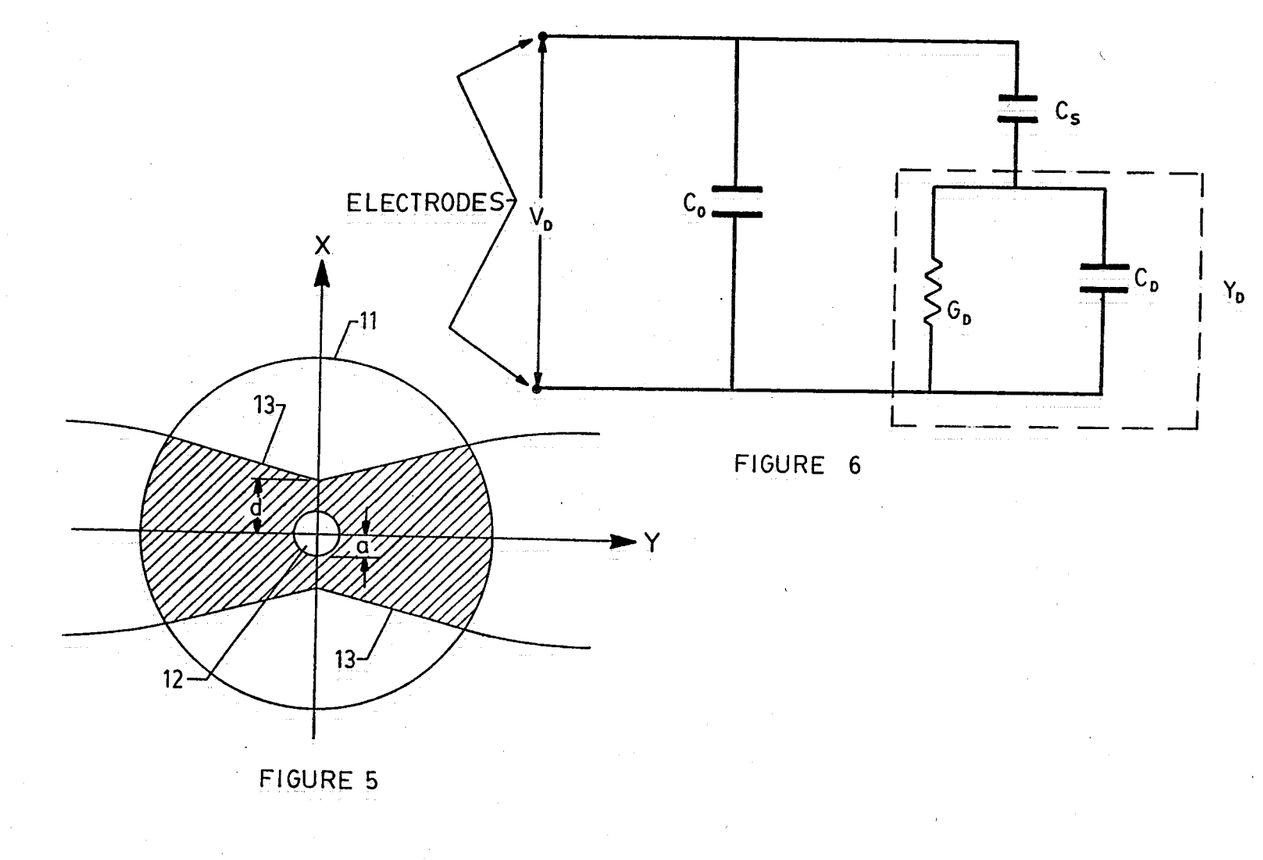
FIG. 5 illustrates another cross-sectional view of the laser of FIGS. 1A and 1B taken along section line A—A with an x and y axis superimposed.
FIG. 6 illustrates a schematic of an equivalent electrical circuit for the laser tube.

The electrode 14 cross-sectional curve as shown in FIG. 5 is the cross-section shown in FIG. 1C reproduced with an x and y axis superimposed upon it to provide an x-y reference for the mathematically expressed cross-sectional shape functions of the electrodes 14 for a symmetric laser tube 10. The actual electrode grooves 13 used in the preferred embodiment closely approximate these mathematical expressions.

The electrodes 14 are shaped to provide an essentially uniform electric field in the chamber 12 of the laser tube 10. Different electrode 14 shapes are required depending upon the chamber 12 diameter as well as the dielectric constant of the laser tube 10 material. It has been found that the distance from the center of the chamber 12 to the low point of the electrode groove 13 must be very close to the radius of the chamber to avoid the necessity of a large voltage source. For chamber 12 diameters of 1-3 mm, the electrodes 14 are formed as a shaped groove 13 as shown in FIGS. 1C and 5 in the laser tube body 11. The shaped grooves 13 run parallel to the longitudinal axis of the laser tube 10. For the large bore—non-waveguide—laser, a similar shape function has been derived for application to the outer body 11 wall.

In the case of the small bore chamber 12—the waveguide laser—, the cross-sectional shape of the electrode groove 13 providing a uniform field in the unexcited chamber 12 is given by:

$$\frac{V_D}{E_o} = (1 + 1/E_r)x + (1 - 1/E_r)\frac{xa^2}{x^2 + y^2} \quad \text{Formula 1}$$

where $V_D$ is the potential measured between the electrodes 14.

$E_o$ is the uniform electric field intensity in the chamber 12.

$E_r$ is the relative dielectric constant of the laser tube 10 material.

x is the distance along the x axis as shown in FIG. 5.

y is the distance along the y axis as shown in FIG. 5.

a is the chamber 12 radius.

In designing a particular electrode 14 geometry, $E_o$ is a given since the field intensity necessary to achieve an output result with a given laser gas mixture is relatively fixed. The diameter of the chamber 12 is also a predetermined factor as well as the electrode 14 potential, $V_D$. With these parameters, the exact geometry of the electrode grooves 13 can be easily computed. To determine the electrode groove 13 geometry for various combinations of $E_o$, $V_D$, and a is a relatively straight forward mathematical computation.

Formula 1 was derived for the unexcited discharge chamber 12—that is a chamber 12 without a discharge medium. The following equation results from the generalized expression of Formula 1:

$$V_D = E_o\left[(1 + 1/E_r)d + (1 - 1/E_r)\frac{a^2}{d}\right] \quad \text{Formula 2}$$

which expresses $V_D$ necessary to produce a uniform electric field (as would be produced by a parallel plate electrode structure) of $E_o$ throughout a chamber 12 of radius "a" surrounded by a dielectric material having a dielectric constant of $E_r$ with electrodes spaced a distance d from the center of the chamber 12 at y=0.

In the case of the large bore chamber 12—the non-waveguide laser—, the cross-sectional shape of the electrodes providing a uniform field in the unexcited chamber 12 is given by Formula 3 which is the equivalent of Formula 1 for the waveguide laser:

$$V_D = \quad \text{Formula 3}$$

-continued $$\frac{E_o}{2}\left\{X\left[\frac{a^2}{b^2}\left(2 - E_r - \frac{1}{E_r}\right) + \left(2 + E_r + \frac{1}{E_r}\right)\right] + \frac{b^2 x}{x^2 + y^2}\left(E_r - \frac{1}{E_r}\right)\left(\frac{a^2}{b^2} - 1\right)\right\}$$

where a is the chamber 12 radius, and b is the radius to the outer wall of the body 11 as shown in FIG. 2B.

The excited gas medium, or as it is sometimes referred to, the discharge plasma, does not affect appreciably the uniformity of the electric field in the chamber 12 when the electrodes 14 structure is defined by Formula 1 or Formula 3 as the case may be. It has been found that the excited gas medium of the present laser supports both a conduction and a displacement current such that the current density is:

$$J = j\omega e_o(1 - j\beta)E_o$$

where $\beta$, given in terms of plasma parameters is $\omega_p^2/\omega\upsilon$ $\omega_p^2$ is the plasma frequency which is equivalent to $n_e e^2/m e_o$ $\omega$ is the radian excitation frequency $\upsilon$ is the momentum transfer collision frequency which is proportional to gas mixture ratios and gas pressure.

$e_o$ is the permittivity of free space $n_e$ is the average electron density in the gas medium e is the electronic charge m is the electron mass Even with $E_r(a/d)^2 > 10$, the presence of an active discharge in the chamber 12, and with significant conductivity as measured by $\beta$, the uniformity of the electric field $E_o$ established by the electrode 14 configuration defined by Formula 1 or 3 and the resulting current density is not appreciably perturbed. Even the fact that the electron density rather than being uniform exhibits a dependence upon the distance from the center of the chamber 12 which is approximately proportional to $$J_o\left(2.405\frac{\sqrt{x^2 + y^2}}{a}\right),$$

the electron density's non-uniformity does not significantly disturb the uniform field configuration of the present invention.

In practice it has been found that the laser of the present invention operates with a very stable discharge current and with very little plasma instability. An analysis of the equivalent circuit for the laser tube 10 provides an explanation of this phenomenon. The discharge admittance of the equivalent circuit shown in FIG. 6 is:

$$Y_D = j\omega C_D(1 - j\overline{\beta}) \quad \text{Formula 4}$$

where $\overline{\beta}$ is the mean value of $\beta$ in the discharge chamber 12. $C_s$ of FIG. 6 is the series ballast capacitance represented by the dielectric material between the chamber 12 and the electrodes 14. This impedance serves to provide stability to the discharge current and to damp any plasma instabilities in a manner similiar to the series resistance in a DC excited laser. $C_o$ of FIG. 6 represents the stray interelectrode capacitance. $C_s$ can be related to $C_D$.

The expression for the discharge admittance, $Y_D$, as expressed by Formula 4 illustrates that as either $\omega$ and/or $v$ increases, the same plasma electron density is obtained in the chamber 12 of the present invention with a decreasing perturbation of the electric field within the plasma. Thus, higher frequency and higher laser gas pressure favors a uniform discharge and a uniform laser pumping which is proportional to $n_e$. Thus improved mode structure and a higher efficiency are provided by a dielectric coupled circular geometry. The most striking feature, however, results from the fact that with frequencies chosen such that $\beta < 1$, higher plasma electron densities are obtained (which is the same as saying increased laser pumping occurs) with lower applied voltages on the electrodes 14 since the loading effect on the capacitive structure by the real part—the ohmic part—of the discharge impedance is reduced. This is further illustrated by analyzing the power dissipated in the plasma per unit length of that portion of the laser tube 10 having an active discharge. The dissipated power is expressed by:

$$P_D = \omega \overline{e_o \beta} E_o^2 (\pi a^2) \text{ per meter}$$

where $\overline{\beta}$ is the volume average electron density. For $\overline{\beta} \cong 0.7$ $V_D = 400$ V rms, a=1 mm, d$\cong$3 mm, and $\omega = 10^9$ radians per second, $P_D \cong 3.5$ watts/cm of discharge length which is a typical operating level for the present invention.

The laser gas medium used in the laser of the present invention is a diffusion/attachment controlled plasma when operating with gas pressure of >10 Torr. This is fairly characteristic of gas lasers of the prior art as well as of the present invention. However, since the gas breakdown point is highly field dependent, the laser of the present invention with its uniform electric field and power dissipation is able to achieve gas breakdown along the length of the laser tube 10 with greater efficiency than prior art lasers. Once the minimum field necessary to achieve gas breakdown is reached, the electric field necessary to maintain a continuous gas discharge is at a level less than the breakdown level. The breakdown voltage point is also dependent upon gas mixture and total pressure of the laser medium. Generally, both the large bore and small bore lasers behave similarly except that the large bore lasers favor lower operating pressure with lower breakdown field strength.

The laser tube 10 is electrically a distributed parameter circuit and the laser tube electrode 14 structure behaves as a transmission line. As such it can be described in terms of an attenuation constant $\alpha$ and propagation constant $\beta_o = 2\pi/\lambda$, and a characteristic impedance $Z_o$. The electrode 14 structure is a series inductance and the equivalent circuit of FIG. 6 is the shunt element. Due to the transmission line behavior of the electrode 14 structure, the voltage on the line varies with position along the laser tube 10 as does the chamber 12 electric field. This variation in electric field can result in a significant variation in laser pumping along the length of the laser tube 10. With the taper of the electrode groove 13 toward the end of the laser tube 10 away from the chamber 12 as illustrated in FIGS. 1A and 1C, the termination appears as an infinite impedance. In practice it has been found that with less than a 2% taper of electrode groove 13 away from the chamber 12, there results a longitudinal voltage (field) variation of less than a few percent along a 16-20 cm length.

Since the laser tube 10 has a round cross-section, the longitudinal voltage distribution and electric field can also be leveled by wrapping inductive loading coils directly around the tube (in shunt). Placing inductive loading coils at periodic intervals of $0.023\lambda$ reduces voltage variation to approximately 2% in the unexcited condition. With discharge loading (the excited condition) the variation does not change appreciable for $\alpha/\beta_o < 0.3$.

As drive power is increased beyond breakdown, $\alpha$ approaches a maximum level so the voltage distribution does not appreciably change with increased power input.

A third method can be used for leveling the longitudinal voltage distribution. Since the laser body 11 is insulating, the metal electrode 14 width can be varied along the tubes 11 length, resulting in a tapered transmission line structure. Using exponential or linear tapers the voltage variation in 16-20 cm of laser tube 10 length can be reduced to less than a few percent.

With mutual inductive coupling to the discharge electrodes 14 as shown in FIG. 4, the primary and secondary coils 42 and 40 can simply be wrapped around the laser tube 10, providing an inherently balanced voltage to the isolated electrodes 14. The secondary coils 40 resonate with the laser tube 10 capacitive impedance and by simply adjusting the position of the primary coil 42 with respect to the secondary coil 40, a good impedance match can be achieved at nearly any resistance level for a given RF power input. The input impedance seen at the primary terminals is approximately:

$$Z_i = j\omega L_1 + \frac{(\omega M)^2}{j\omega L_2 + Z_D}$$

where M is the mutual coupling coefficient (adjustable) and $Z_D$ is the line input impedance at the feed point. The ability to use mutual inductive coupling to the discharge electrodes is another superior advantage of the round geometry laser tube 10 over the square geometry of the prior art. The square geometry of the prior art required it to be mounted to a surface such as a heatsink, thereby, preventing the encircling of the laser with primary and secondary coils.

I have disclosed a preferred embodiment description and application of the invention. Other modifications of the invention which are not specifically disclosed or referred to will be apparent to those skilled in the art in light of the foregoing description. This description is intended to provide a concrete example of the preferred embodiment structure and application, clearly disclosing the present invention and its operative principals. Accordingly, the invention is not limited to any particular embodiment or configurations and variations of the present invention which fall within the spirit and broad scope of the appended claims are covered.

What is claimed is:

1. A gas laser comprising:
   (a) an electrically insulative body defining a discharge chamber for containing a laser gas;

(b) a laser gas disposed in the chamber;
(c) first and second electrodes means for exciting said laser gas;
(d) means for applying a voltage of alternating polarity between the first and second electrodes to establish a laser-exciting discharge in the laser gas;
(e) means for attaching a first laser mirror to one end of the body and a second laser mirror to the other end of the body, both mirrors being in axial alignment with the chamber with a portion of said chamber between said mirrors defining a resonant cavity with one of said mirrors being partially reflective;
(f) said means for attaching said laser mirrors comprising a first metallized ring formed around one end of said body and a second mtallized ring formed around the other end of said body, a first mirror mount for mounting said first mirror therein and a second mirror mount for mounting said second mirror therein with said first mount brazed to said first metallized ring and said second assembly brazed to said second metallized ring.

2. A gas laser comprising:
(a) an electrically insulative body defining a discharge chamber for containing a laser gas;
(b) a laser gas disposed in the chamber;
(c) first and second electrodes disposed parallel to the axis of the chamber and applied to the outside walls of the body, so that the first and second electrodes are not in physical contact with the chamber;
(d) mirror means cooperating with said discharge chamber to define a resonator thereby having energy abstracting means; and
(e) means for applying a voltage of alternating polarity between the first and second electrodes to establish a laser-exciting discharge in the laser gas.

3. The gas laser of claims 1 or 2, wherein the body is comprised of a single monolithic solid insulating material.

4. The gas laser of claim 3, wherein the monolithic body is ceramic.

5. The gas laser of claims 1 or 2, wherein the body is comprised of a dielectric material.

6. The gas laser of claims 1 or 2, wherein the chamber is elongated in that its length is a large dimension relative to its cross-sectional dimension.

7. The gas laser of claims 1 or 2, wherein the electrodes extend substantially the entire length of the body.

8. The gas laser of claim 2, further comprising a first laser mirror attached to one end of the body and a second laser mirror attached to the other end of the body, both mirrors being in axial alignment with the chamber.

9. The gas laser of claim 8, further comprising a means of attaching a mirror to each end of the body, by mounting each mirror in a mirror assembly and by affixing the mirror assembly to the body by first forming a metallized ring around each end of the body and then by brazing the mirror assemblies to the metallized rings.

10. The gas laser of claim 1 or 2, wherein the electrodes are applied parallel to the axis of the chamber and to the opposing outside walls of the body.

11. The gas laser of claims 1 or 2, wherein the body is of a circular cross-section.

12. The gas laser of claims 1 or 2, wherein the chamber is of a circular cross-section.

13. The gas laser of claims 1 or 2, wherein the chamber is formed along the axis of the body.

14. The gas laser of claims 1 or 2, wherein the means for applying a voltage of alternating polarity between the first and second electrodes comprises:
(a) a secondary coil of electrically conducting wire wrapped around the body making physical and electrical contact with the body only at the end points of the secondary coil which end points are connected to a respective first and second electrode;
(b) a primary coil of electrically conducting wire wrapped around the secondary coil without making physical or electrical contact with the secondary coil or the body, the end points of the primary coil being electrically connected to a source of RF energy so that the mutual inductance between the secondary and primary coils results in the provision of an inherently balanced voltage to the electrodes.

15. The gas laser of claim 14, wherein multiple primary and secondary coil combinations are wrapped around the body along its length, at 0.023 intervals, each combination being connected to a source of RF energy thereby reducing the discharge electric field variations along the length of the chamber.

16. The gas laser of claim 14, wherein impedance matching between the RF power source and the primary-secondary coil and laser tube capactive impedance is achieved for a given RF power input by adjusting the primary coil relative to the secondary coil.

17. The gas laser of claim 1, wherein the mirror mount comprises:
(a) a body flange having means for brazing said body flange to a metallized ring on the end of the body which flange allows the laser beam to pass unobstructed out of the chamber through the body flange;
(b) a mirror flange sized to mate in axial alignment with the body flange having a recess for a laser mirror to be placed in unobstructed axial alignment with the laser beam emanating from the chamber;
(c) a means for hermetically sealing without organic materials the body flange and the mirror flange; and
(d) a means for holding the laser mirror in the mirror recess.

18. The gas laser of claim 17, further comprising a means for adjusting the laser mirrors for optimum alignment with the laser beam.

19. The gas laser of claim 18, wherein the means for adjusting the laser mirrors comprises a mirror flange having:
(a) a first circular fin surrounding a first end of a mirror recess; and
(b) a second circular fin surrounding a second end of the mirror recess, the first circular fin having a plurality of threaded receiving holes in its periphery each hole equidistant from the other hold having a threaded set screw in it so that when a set screw is compressed against the second circular fin, the second circular fin bends relative to the first circular fin thereby causing the axial alignment of the mirror recess to change.

20. The gas laser of claim 17, wherein the means for hermetically sealing the body flange to the mirror flange without organic materials comprises a crushable metal O-ring inserted between the two flanges without obstructing the laser beam, so that when the two flanges are compressed together the O-ring crushes and forms a conformal seal between the two flanges.

21. The gas laser of claim 20, wherein the crushable O-ring is made of the meal lead, tin, indium or their alloys.

22. The gas laser of claim 17, wherein the means for holding the laser mirror in the mirror recess comprises:
   (a) a compression plunger sized to concentrically mate with the mirror recess and to compress the mirror into the bottom of the mirror recess;
   (b) a polymer washer inserted between the compression plunger and the laser mirror allowing for the unobstructed passage of the laser beam through the center of the washer;
   (c) a crushable metal O-ring between the laser mirror and the bottom of the mirror recess to provide non-organic hermetic sealing of the laser tube from the outside environment, and
   (d) means for securing the compression plunger to compress said mirror into the bottom of the mirror recess.

23. The gas laser of claim 22, wherein the crushable O-ring is made of the metal lead, tin, indium or their alloys.

24. The gas laser of claim 22, wherein the compression plunger has an aperture in axial alignment with the laser mirror through the compression plunger and through its external end whereby said plunger may be used with a partially transmissive laser mirror to allow exiting of the laser beam.

25. The gas laser of claim 17 further comprising a cooling housing, the cooling housing extending between the body flanges attached to each end of the body and further having means for input and exit of cooling fluid.

26. The gas laser of claim 25 wherein the cooling housing is fabricated of metal to provide electromagnetic shielding for the laser.

27. The gas laser of claim 17 further comprising means for mechanically coupling a multiple of said gas lasers in axial alignment to form an extended laser having a length which is an integer multiple of said gas laser.

28. The gas laser of claims 1 or 2, wherein the body defines a plurality of parallel chambers.

29. The gas laser of claims 1 or 2, wherein the electrodes are tapered away from the chamber along a line beginning at the center of the electrode and extending towards the end of the electrode.

30. The gas laser of claims 1 or 2, wherein the width of the electrodes is constant along its length.

31. The gas laser of claims 1 or 2, wherein the width of the electrode varies along its length.

32. The gas laser of claims 1 or 2, wherein the electrodes comprise a longitudinal series of electrically separated segments.

33. A gas laser comprising:
   (a) an electrically insulative body defining a discharge chamber for containing a laser gas;
   (b) mirror means in connective relationship with said discharge chamber to define a resonant chamber thereby having energy abstracting means;
   (c) first and second grooves disposed parallel to the axis of the chamber formed in the outside walls of the electrically insulative body;
   (d) first and second electrodes applied to the electrically insulative body within the confines of the grooves and not in contact with said chamber;
   (e) a laser gas disposed in the chamber; and
   (f) means for applying a voltage of alternating polarity between the first and second electrodes to establish a laser-exciting discharge in the laser gas.

34. A waveguide gas laser for the generation of laser light comprising:
   (a) an electrically insulative circular body defining an axial aligned chamber having a circular cross-section, the chamber being elongated in that the chamber's length is a large dimension relative to its cross-sectional dimension;
   (b) mirror means in connective relationship with said chamber to define a resonant chamber thereby having energy abstracting means;
   (c) a laser gas disposed in the chamber;
   (d) first and second grooves disposed parallel to the axis of the chamber formed in the outside walls of the body opposite one another and not in contact with said chamber which grooves are approximately defined by the equation $$V_D = E_o < (1+E_r)d + (1-1/E_R)a^2/d >$$

where $V_D$ is the potential difference necessary to be applied across the electrodes to produce a uniform electric field of $E_o$ throughout the chamber, where $E_R$ is the dielectric constant of the body material, where "a" is the radius of the chamber, and where "d" is the distance from the center of the chamber to a point on the groove which is the closest to the center of the chamber where "d" is always greater than "a";
   (e) first and second electrodes applied to the body within the confines of the grooves; and
   (f) a means for applying a voltage of alternating polarity between the first and second electrodes to establish a laser-exciting discharge in the laser gas.

35. The gas laser of claim 34, wherein the first and second grooves extend substantially the entire length of the body.

36. A non-waveguide gas laser for the generation of laser light comprising:
   (a) an electrically insulative circular body defining an axial aligned discharge chamber having a circular cross-section, the discharge chamber being elongated in that the chamber's length is a large dimension relative to its cross-sectional dimension;
   (b) mirror means cooperating with said discharge chamber to define a resonant chamber having energy abstracting means;
   (c) a laser gas disposed in the chamber;
   (d) first and second electrodes formed in contact with the outside wall of the body, disposed parallel to the axis of the chamber opposite one another which electrodes are approximately defined by the equation $$V_D = E_o/2 \{ x\, a^2/b^2 (2 - E_r - 1/E_r) + (2 + E_r + 1/E_r) + b^2 x/x^2 + y^2 (E_r - 1/E_r)(a^2/b^2 - 1) \}$$

where "a" is the chamber radius, where "b" is the radius to the outer wall of the body, where "x" and "y" are points along an x-y coordinate system having the axis of the chamber as the origin of both "x" and "y", where $E_o$ is a uniform electric field intensity in the chamber, where $E_r$ is a relative dielectric constant of the material of the electrically insulative body, and where $V_D$ is a potential measured between the electrodes;

(c) a means for applying a voltage of alternating polarity between the first and second electrodes to establish a laser-exciting discharge in the laser gas.

37. The gas laser of claim 36, wherein the first and second electrodes extend substantially the entire length of the body.

* * * * *

UNITED STATES PATENT AND TRADEMARK OFFICE
CERTIFICATE OF CORRECTION

PATENT NO. : 4,596,018
DATED : June 17, 1986
INVENTOR(S) : Gruber, et al.

It is certified that error appears in the above-identified patent and that said Letters Patent is hereby corrected as shown below:

Column 2, line 17, "both" should be --bore--;

Column 3, line 47, "are" should be --as--;

Column 4, line 16, "with with" should be --with--;

Column 5, line 6, "life the" should be --life, the--;

Column 6, line 67, "24" should be --29--;

Column 7, line 48, "it's" should be --its--;

Column 8, line 34, "coil" should be --cable--;

UNITED STATES PATENT AND TRADEMARK OFFICE
CERTIFICATE OF CORRECTION

PATENT NO. : 4,596,018  
DATED : June 17, 1986  
INVENTOR(S) : Gruber, et al.

page 2 of 2

It is certified that error appears in the above-identified patent and that said Letters Patent is hereby corrected as shown below:

Column 11, line 3, "similiar" should be --similar--;

Column 15, line 4, "meal" should be --metal--;

Column 16, line 22, "$V_D=E_O\langle(1+E_r)d+(1-1/E_R)a^2/d\rangle$" should be --$V_D=E_O[(1+E_r)d+(1-1/E_R)a^2/d]$--; and Column 16, line 59, "$V_D=E_O/2\{xa^2/b^2(2-E_r-1/E_r) + (2+E_r+1/E_r)+$" should be --$V_D=E_O/2\{x[a^2/b^2(2-E_r-1/E_r) + (2+E_r+1/E_r)]+$--.

Signed and Sealed this

Thirtieth Day of September 1986

[SEAL]

Attest:

DONALD J. QUIGG

Attesting Officer

Commissioner of Patents and Trademarks